(12) United States Patent
Yukawa

(10) Patent No.: US 10,000,095 B2
(45) Date of Patent: Jun. 19, 2018

(54) PNEUMATIC TIRE WITH DIMPLES ON ONE OR BOTH SIDEWALL OUTER SURFACES

(71) Applicant: SUMITOMO RUBBER INDUSTRIES, LTD., Kobe-shi, Hyogo (JP)

(72) Inventor: Naoki Yukawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 853 days.

(21) Appl. No.: 14/381,127

(22) PCT Filed: Feb. 26, 2013

(86) PCT No.: PCT/JP2013/054850
§ 371 (c)(1),
(2) Date: Aug. 26, 2014

(87) PCT Pub. No.: WO2013/129351
PCT Pub. Date: Sep. 6, 2013

(65) Prior Publication Data
US 2015/0013869 A1 Jan. 15, 2015

(30) Foreign Application Priority Data
Feb. 27, 2012 (JP) .................................. 2012-039493

(51) Int. Cl.
*B60C 3/06* (2006.01)
*B60C 13/02* (2006.01)
(Continued)

(52) U.S. Cl.
CPC ................ *B60C 13/02* (2013.01); *B60C 3/06* (2013.01); *B60C 15/0242* (2013.01);
(Continued)

(58) Field of Classification Search
CPC ....... B60C 13/02; B60C 13/001; B60C 13/00; B60C 3/06; B60C 15/0242;
(Continued)

(56) References Cited

U.S. PATENT DOCUMENTS 2,679,277 A * 5/1954 Gray .............................. 152/524
3,518,335 A * 6/1970 Jablonski ....................... 152/523
(Continued)

FOREIGN PATENT DOCUMENTS

EP 0481687 A1 4/1992
JP 6-80004 A 3/1994
(Continued)

OTHER PUBLICATIONS

International Search Report issued in PCT/JP2013/054850, dated May 7, 2013.
Written Opinion issued in PCT/JP2013/054850, dated May 7, 2013.

*Primary Examiner* — Adrienne C Johnstone
(74) *Attorney, Agent, or Firm* — Birch, Stewart, Kolasch & Birch, LLP

(57) ABSTRACT

A pneumatic tire 2 has a marking on each sidewall 8 thereof. A large number of dimples 62 are formed in a region between the marking and a rim protector 34. These dimples 62 are arranged along a circumferential direction. These dimples 62 form a row. The row includes: (1) dimples each having a plane shape of a circle; or (2) dimples in each of which a plane shape is substantially a rectangle, and a ratio of a length in the circumferential direction to a width in a radial direction is equal to or greater than 1.0 and equal to or less than 3.0.

6 Claims, 8 Drawing Sheets

(51) Int. Cl.
*B60C 15/02* (2006.01)
*B60C 15/06* (2006.01)
*B60C 17/00* (2006.01)
*B60C 15/024* (2006.01)
*B60C 19/00* (2006.01)
*B60C 15/00* (2006.01)

(52) U.S. Cl.
CPC .......... *B60C 17/0009* (2013.01); *B60C 19/00* (2013.01); *B60C 15/0045* (2013.01); *B60C 2015/009* (2013.01); *B60C 2015/061* (2013.01); *Y10T 152/10738* (2015.01); *Y10T 152/10837* (2015.01)

(58) Field of Classification Search
CPC .......... B60C 15/0045; B60C 2015/061; B60C 17/0009; B60C 23/19; Y10T 152/10837
USPC ........ 152/523, 524, 546, 517, 153, 456, 554
See application file for complete search history.

(56) References Cited

U.S. PATENT DOCUMENTS

| | | | | |
|---|---|---|---|---|
| 4,940,069 A | * | 7/1990 | Nakaski | .............. 152/546 X |
| 5,332,016 A | * | 7/1994 | Tsuruta | ............... B60C 13/02 |
| | | | | 152/523 |
| 6,510,883 B2 | * | 1/2003 | Baumann | ............. 152/517 X |
| 8,656,969 B2 | * | 2/2014 | Takahashi | ............ B60C 13/02 |
| | | | | 152/523 X |
| 2008/0163969 A1 | * | 7/2008 | Maxwell | ................ B60C 13/02 |
| | | | | 152/523 |
| 2009/0032161 A1 | | 2/2009 | Yamaguchi | |
| 2010/0193102 A1 | | 8/2010 | Tsuruta et al. | |
| 2011/0030862 A1 | | 2/2011 | Hayashi et al. | |
| 2011/0094646 A1 | | 4/2011 | Watanabe | |
| 2011/0108174 A1 | * | 5/2011 | Takahashi | ............. B60C 13/02 |
| | | | | 152/153 |
| 2012/0060994 A1 | | 3/2012 | Hayashi et al. | |
| 2012/0097304 A1 | * | 4/2012 | Kojima | ................ B60C 13/02 |
| | | | | 152/523 |
| 2013/0168002 A1 | | 7/2013 | Mishima | |

FOREIGN PATENT DOCUMENTS

| | | | |
|---|---|---|---|
| JP | 06032121 A | * | 4/1994 |
| JP | 10-58925 A | | 3/1998 |
| JP | 2009-029381 A | | 2/2009 |
| JP | 2009-029385 A | | 2/2009 |
| JP | 2009-160990 A | | 7/2009 |
| JP | 2009-298397 A | | 12/2009 |
| JP | 2010-155576 A | | 7/2010 |
| JP | 2010260378 A | * | 11/2010 |
| JP | 2010-280322 A | | 12/2010 |
| WO | WO 2007/032405 A1 | | 3/2007 |
| WO | WO 2009/133892 A1 | | 11/2009 |
| WO | WO 2012/018128 A1 | | 2/2012 |

* cited by examiner

PNEUMATIC TIRE WITH DIMPLES ON ONE OR BOTH SIDEWALL OUTER SURFACES

TECHNICAL FIELD

The present invention relates to pneumatic tires. Specifically, the present invention relates to pneumatic tires having dimples on side surfaces thereof.

BACKGROUND ART

In recent years, run flat tires including load support layers inside sidewalls have been developed and widespread. Highly hard crosslinked rubber is used for the support layers. Such run flat tires are called a side reinforcing type. In this type of a run flat tire, if the internal pressure is reduced due to puncture, a load is supported by the support layers. The support layers suppress flexure of the tire in a punctured state. Even if running is continued in the punctured state, the highly hard crosslinked rubber suppresses heat generation in the support layers. This run flat tire allows for running for some distance even in the punctured state. An automobile having such run flat tires mounted thereon need not to be always equipped with a spare tire. The use of this run flat tire avoids change of a tire in an inconvenient place.

When running with the run flat tire in a punctured state is continued, deformation and restoration of the support layers are repeated. Due to the repetition, heat is generated in the support layers, and the temperature of the tire reaches a high temperature. The heat causes breakage of rubber components of the tire and separation among the rubber components of the tire. It is impossible to run with the tire in which the breakage and the separation have occurred. Run flat tires are desired which allow for running for a long period of time in a punctured state, in other words, run flat tires are desired which are less likely to cause breakage and separation due to heat.

WO2007/032405 discloses a run flat tire having a large number of fins on sidewalls thereof. The surface area of the tire having the fins is large. The large surface area promotes release of heat from the tire to the atmosphere. In the tire, the temperature is less likely to rise.

JP2009-298397 discloses a run flat tire having dimples on sidewalls thereof. The surface shape of each dimple is a circle. The surface area of each sidewall is large. In the tire, the dimples generate turbulent flow. The large surface area and the turbulent flow promote release of heat from the sidewall to the atmosphere. In the tire, the temperature is less likely to rise. The tire is excellent in durability during running in a punctured state.

CITATION LIST

Patent Literature

Patent Literature 1: WO2007/032405
Patent Literature 2: JP2009-298397

SUMMARY OF THE INVENTION

Problems to be Solved by the Invention

A part of each side portion other than dimples is a land. At immediately below the land, the thickness of each sidewall is large. In other words, the tire including dimples has a heavy weight.

In general, dimples are arranged along a circumferential direction. Dimples in each of which a plane shape is a rectangle and a ratio of a length of its long sides to a length of its short sides is large are preferred. The length of the short sides is the length, in a radial direction, of the dimple. In a tire having the dimples, the volume of the land is small. Therefore, weight increase of the tire due to dimples can be suppressed. According to findings by the inventor of the present invention, in order to generate sufficient turbulent flow in the dimple in which the ratio of the length of the long sides to the length of the short sides is large, the length of the short sides is needed to be equal to or greater than 7 mm.

When running with a run flat tire in a punctured state is continued, the vicinity of a tip of each bead apex is easily damaged. In order to suppress the damage, it is preferable that dimples are provided in the vicinity of an inner end, in the radial direction, of the sidewall.

The side portion of the tire has a marking. Dimples need to be arranged so as to avoid the marking. In ECE30 standards in Europe, a marking including, for example, size, month and year of manufacture, E number, indication of snow tire, and indication of tubeless tire, is required to be indicated inward of a position of a maximum width in the radial direction. When dimples are arranged in the vicinity of an inner end, in the radial direction, of the sidewall while avoiding the marking, a region in which dimples can be processed has a small width in the radial direction. In the region, dimples each having the plane shape of a rectangle and each having sufficiently large short sides cannot be arranged.

An object of the present invention is to provide a pneumatic tire which is excellent in durability in spite of small width of a processible region located inward of the marking in the radial direction.

Solution to the Problems

A pneumatic tire according to the present invention has a marking on a surface of each side portion thereof. The tire includes one or two rows formed by a large number of dimples arranged along a circumferential direction in a processible region positioned on the surface of the side portion and inward of the marking in the radial direction. One row includes:

(1) dimples each having a plane shape of a circle; or
(2) dimples in each of which a plane shape is substantially a rectangle, and a ratio of a length in the circumferential direction to a width in the radial direction is equal to or greater than 1.0 and equal to or less than 3.0. The row of the dimples is suitable for a tire in which a width in the radial direction of the processible region is 2.0 mm or greater and 8.0 mm or less.

When the width, in the radial direction, of the processible region is equal to or greater than 7.0 mm and equal to or less than 10.0 mm, the number of the rows is preferably 1. The row includes dimples in each of which the plane shape is substantially a rectangle and the ratio of the length in the circumferential direction to the width in the radial direction is equal to or greater than 1.0 and equal to or less than 3.0.

When the width, in the radial direction, of the processible region is equal to or greater than 9.0 mm and equal to or less than 12.0 mm, the number of the rows is preferably 2. A first row includes dimples in each of which the plane shape is substantially a rectangle, the ratio of the length in the circumferential direction to the width in the radial direction is equal to or greater than 1.0 and equal to or less than 3.0, and the width in the radial direction is 7 mm. A second row includes:

(1) dimples in each of which the plane shape is a circle and a diameter thereof is equal to or greater than 2.0 mm and equal to or less than 5.0 mm; or (2) dimples in each of which the plane shape is substantially a rectangle, the ratio of the length in the circumferential direction to the width in the radial direction is equal to or greater than 1.0 and equal to or less than 3.0, and the width in the radial direction is equal to or greater than 2.0 mm and equal to or less than 5.0 mm.

When the width, in the radial direction, of the processible region is equal to or greater than 12.0 mm and equal to or less than 17.0 mm, the number of the rows is preferably 2. A first row includes dimples in each of which the plane shape is substantially a rectangle, the ratio of the length in the circumferential direction to the width in the radial direction is equal to or greater than 1.0 and equal to or less than 3.0, and the width in the radial direction is equal to or greater than 7.0 mm and equal to or less than 10.0 mm. A second row includes:

(1) dimples in each of which the plane shape is a circle and a diameter thereof is equal to or greater than 2.0 mm and equal to or less than 10.0 mm; or (2) dimples in each of which the plane shape is substantially a rectangle, the ratio of the length in the circumferential direction to the width in the radial direction is equal to or greater than 1.0 and equal to or less than 3.0, and the width in the radial direction is equal to or greater than 2.0 mm and equal to or less than 10.0 mm.

When the width, in the radial direction, of the processible region is equal to or greater than 17.0 mm and equal to or less than 20.0 mm, the number of the rows is preferably 2. A first row includes dimples in each of which the plane shape is substantially a rectangle, the ratio of the length in the circumferential direction to the width in the radial direction is equal to or greater than 1.0 and equal to or less than 3.0, and the width in the radial direction is 10 mm. A second row includes:

(1) dimples in each of which the plane shape is a circle and a diameter thereof is equal to or greater than 7.0 mm and equal to or less than 10.0 mm; or (2) dimples in each of which the plane shape is substantially a rectangle, the ratio of the length in the circumferential direction to the width in the radial direction is equal to or greater than 1.0 and equal to or less than 3.0, and the width in the radial direction is equal to or greater than 7.0 mm and equal to or less than 10.0 mm.

The tire includes a bead apex. Preferably, the number of the rows is 2. The width in the radial direction of each dimple of the first row is greater than the width in the radial direction of each dimple of the second row. Preferably, in the radial direction, a position of the first row overlaps a position of an end of the bead apex.

The number of the rows may be 2, the number of dimples of the first row may be equal to as the number of dimples of the second row, and the length, in the circumferential direction, of each dimple of the first row may be equal to the length, in the circumferential direction, of each dimple of the second row. In the tire, preferably, the position of each dimple of the first row is displaced in the circumferential direction relative to the position of each dimple of the second row.

The tire may include a rim protector. The processible region is located between the rim protector and the marking.

The row of dimples is particularly suitable for a tire including:

a tread having an outer surface which forms a tread surface;

a pair of sidewalls extending from ends, respectively, of the tread substantially inward in the radial direction;

a pair of beads located substantially inward of the sidewalls, respectively, in the radial direction;

a carcass extending along the tread and the sidewalls and on and between the beads; and a pair of load support layers located inward of the sidewalls, respectively, in an axial direction.

Preferably, one side surface includes the row of dimples and the other side surface does not include the row.

An edge of the dimple may be located on a profile surface of the tire.

Advantageous Effects of the Invention

A region positioned on a surface of a side portion and inward of the marking in the radial direction is narrow. In the tire according to the present invention, (1) dimples each having a plane shape of a circle, or (2) dimples in each of which the plane shape is substantially a rectangle, the ratio of the length in the circumferential direction to the width in the radial direction is equal to or greater than 1.0 and equal to or less than 3.0, are present in the region. The dimples achieve a large surface area of a side surface. The large surface area promotes release of heat from the tire to the atmosphere. Further, the dimples generate turbulent flow around the tire. The turbulent flow promotes release of heat from the tire to the atmosphere. The tire is excellent in durability.

DESCRIPTION OF EMBODIMENTS

The following will describe in detail the present invention based on preferred embodiments with appropriate reference to the drawings.

Figure 1:
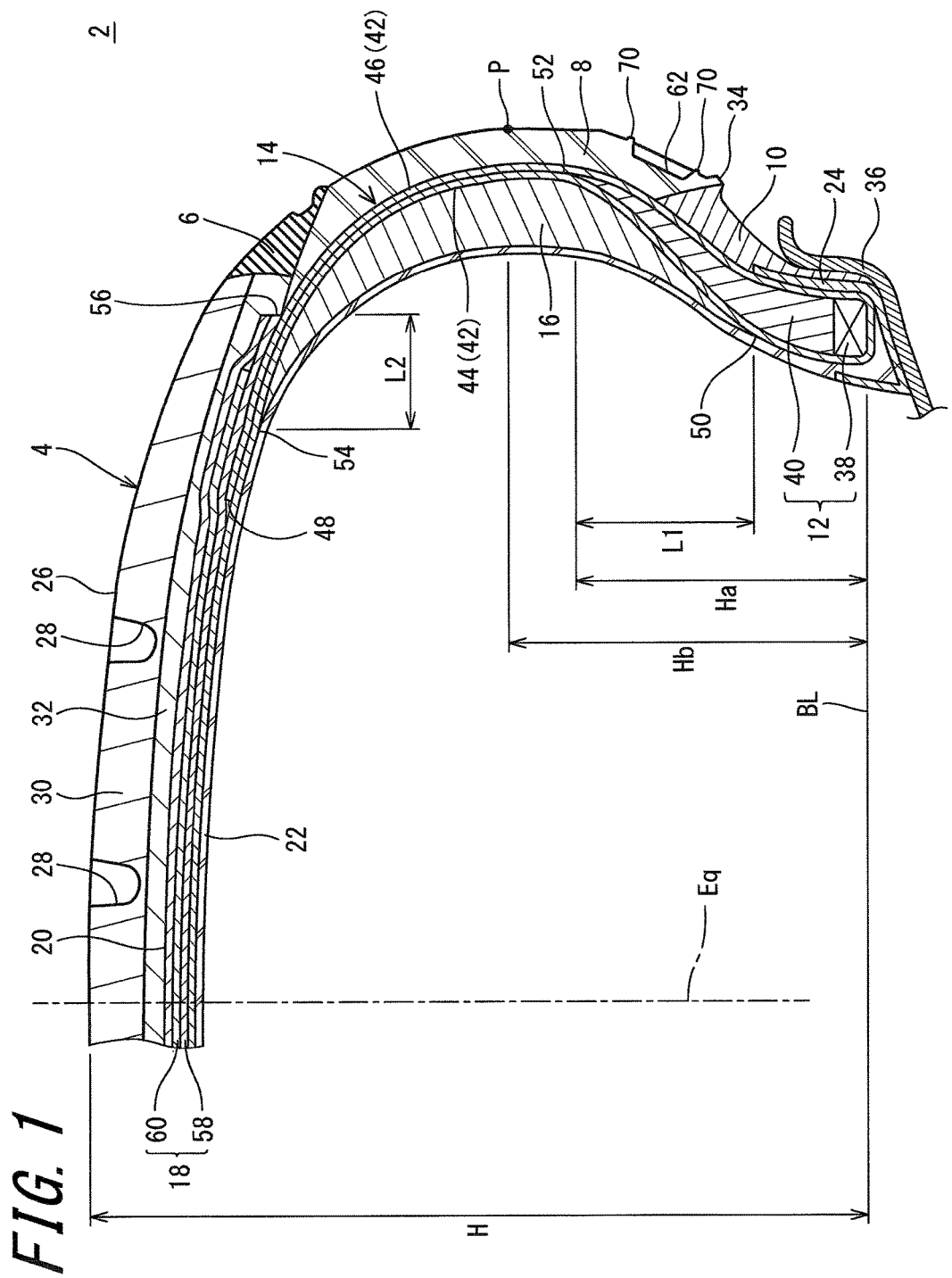
FIG. 1 is a cross-sectional view showing a portion of a pneumatic tire according to one embodiment of the present invention.

FIG. 1 shows a run flat tire 2. In FIG. 1, the up-down direction is the radial direction of the tire 2, the right-left direction is the axial direction of the tire 2, and the direction perpendicular to the surface of the sheet is the circumferential direction of the tire 2. In FIG. 1, an alternate long and short dash line Eq represents the equator plane of the tire 2. The shape of the tire 2 is symmetrical about the equator plane Eq except for a tread pattern (described in detail later). In FIG. 1, an arrow H indicates the height of the tire 2 from a base line BL (described in detail later).

The tire 2 includes a tread 4, wings 6, sidewalls 8, clinches 10, beads 12, a carcass 14, load support layers 16, a belt 18, a band 20, an inner liner 22, and chafers 24. The belt 18 and the band 20 form a reinforcing layer. The reinforcing layer may be composed of the belt 18 only. The reinforcing layer may be composed of the band 20 only.

The tread 4 has a shape projecting outward in the radial direction. The tread 4 forms a tread surface 26 which is brought into contact with a road surface. Grooves 28 are formed on the tread surface 26. A tread pattern is formed by the grooves 28. The tread 4 includes a cap layer 30 and a base layer 32. The cap layer 30 is formed from a crosslinked rubber. The base layer 32 is formed from another crosslinked rubber. The cap layer 30 is located outward of the base layer 32 in the radial direction. The cap layer 30 is laminated on the base layer 32.

Each sidewall 8 extends from each end of the tread 4 substantially inward in the radial direction. The sidewall 8 is formed from a crosslinked rubber. The sidewall 8 prevents injury of the carcass 14. The sidewall 8 includes a rim protector 34. The rim protector 34 projects outward in the axial direction. During running in a punctured state, the rim protector 34 abuts against a flange 36 of a rim. The abutment allows deformation of the bead 12 to be suppressed. The tire 2 in which the deformation is suppressed is excellent in durability in a punctured state. The tire 2 may not include the rim protector 34.

Each clinch 10 is located substantially inward of the sidewall 8 in the radial direction. The clinch 10 is located outward of the bead 12 and the carcass 14 in the axial direction. The clinch 10 abuts against the flange 36 of the rim.

Each bead 12 is located inward of the each sidewall 8 in the radial direction. The bead 12 includes a core 38 and an apex 40 extending from the core 38 outward in the radial direction. The core 38 has a ring shape and includes a non-stretchable wound wire (typically, a steel wire). The apex 40 is tapered outward in the radial direction. The apex 40 is formed from a highly hard crosslinked rubber.

In FIG. 1, an arrow Ha indicates the height of the apex 40 from the base line BL. In other words, the height Ha is the distance between an outer end, in the radial direction, of the bead and the base line. The base line BL passes through an innermost point, in the radial direction, of the core 38. The base line BL extends in the axial direction. A ratio (Ha/H) of the height Ha of the apex 40 to the height H of the tire 2 is preferably equal to or greater than 0.1 and equal to or less than 0.7. The apex 40 having a ratio (Ha/H) of 0.1 or greater can support the weight of the vehicle in a punctured state. The apex 40 contributes to durability of the tire 2 in a punctured state. In this respect, the ratio (Ha/H) is more preferably equal to or greater than 0.2. The tire 2 having a ratio (Ha/H) of 0.7 or less is excellent in ride comfort. In this respect, the ratio (Ha/H) is more preferably equal to or less than 0.6.

In FIG. 1, an arrow Hb indicates the height at a position P of a maximum width from the base line BL. A ratio of the height Ha to the height Hb is preferably equal to or greater than 80%. The side portion of the tire 2 having the ratio of equal to or greater than 80% has a great stiffness. In the tire 2, deformation of the side portion relative to the rim flange as a fulcrum at the time of puncture is suppressed. The tire 2 is excellent in durability in a punctured state. In this respect, the ratio is more preferably equal to or greater than 85% and particularly preferably equal to or greater than 90%. In light of ride comfort in a normal state (a state where the tire 2 is inflated to a normal internal pressure), the ratio is preferably equal to or less than 110%.

The carcass 14 is formed of a carcass ply 42. The carcass ply 42 extends on and between the beads 12 on both sides, and extends along the tread 4 and the sidewalls 8. The carcass ply 42 is turned up around each core 38 from the inner side to the outer side in the axial direction. Due to this turning-up, a main portion 44 and turned-up portions 46 are formed in the carcass ply 42. Each end 48 of the turned-up portions 46 reaches immediately below the belt 18. In other words, each turned-up portion 46 overlaps the belt 18. The carcass 14 has a so-called "ultra-highly turned-up structure". The carcass 14 having the ultra-highly turned-up structure contributes to durability of the tire 2 in a punctured state. The carcass 14 contributes to durability in a punctured state.

The carcass ply 42 includes a large number of cords aligned with each other, and a topping rubber. The absolute value of the angle of each cord relative to the equator plane is 45° to 90°. Particularly, the absolute value of the angle is 75° to 90°. In other words, the carcass 14 has a radial structure. The cords are formed from an organic fiber. Examples of preferable organic fibers include polyester fibers, nylon fibers, rayon fibers, polyethylene naphthalate fibers, and aramid fibers.

Each load support layer 16 is located inward of the sidewall 8 in the axial direction. The support layer 16 is interposed between the carcass 14 and the inner liner 22. The support layer 16 is tapered inward and outward in the radial direction. The support layer 16 has a crescent-like shape. The support layer 16 is formed from a highly hard crosslinked rubber. When the tire 2 is punctured, the support layer 16 supports a load. The support layer 16 allows for running for some distance with the tire 2 even in a punctured state. The run flat tire 2 is of a side reinforcing type. The tire 2 may include a support layer having a shape different from the shape of the support layer 16 shown in FIG. 1.

A portion of the carcass 14 which overlaps the support layer 16 is separated from the inner liner 22. In other words, the carcass 14 is bent due to the presence of the support layer 16. In a punctured state, a compressive load is applied to the support layer 16, and a tensile load is applied to a region of the carcass 14 which is near the support layer 16. The support layer 16 is a lump of rubber and can sufficiently bear the compressive load. The cords of the carcass 14 can sufficiently bear the tensile load. The support layer 16 and the carcass cords suppress vertical flexure of the tire 2 in a punctured state. The tire 2 in which vertical flexure is suppressed is excellent in handling stability in a punctured state.

In light of suppression of vertical distortion in a punctured state, the hardness of the support layer 16 is preferably equal to or greater than 60 and more preferably equal to or greater than 65. In light of ride comfort in a normal state, the hardness is preferably equal to or less than 90 and more preferably equal to or less than 80. The hardness is measured according to the standard of "JIS K6253" with a type A durometer. The hardness is measured by pressing the durometer against the cross section shown in FIG. 1. The measurement is performed at a temperature of 23° C.

A lower end 50 of the support layer 16 is located inward of an upper end 52 of the apex 40 (i.e., an outer end, in the radial direction, of the bead) in the radial direction. In other words, the support layer 16 overlaps the apex 40. In FIG. 1, an arrow L1 indicates the distance in the radial direction between the lower end 50 of the support layer 16 and the upper end 52 of the apex 40. The distance L1 is preferably equal to or greater than 5 mm and equal to or less than 50 mm. In the tire 2 in which the distance L1 falls within this range, a uniform stiffness distribution is obtained. The distance L1 is more preferably equal to or greater than 10 mm. The distance L1 is more preferably equal to or less than 40 mm.

An upper end 54 of the support layer 16 is located inward of an end 56 of the belt 18 in the axial direction. In other words, the support layer 16 overlaps the belt 18. In FIG. 1, an arrow L2 indicates the distance in the axial direction between the upper end 54 of the support layer 16 and the end 56 of the belt 18. The distance L2 is preferably equal to or greater than 2 mm and equal to or less than 50 mm. In the tire 2 in which the distance L2 falls within this range, a uniform stiffness distribution is obtained. The distance L2 is more preferably equal to or greater than 5 mm. The distance L1 is more preferably equal to or less than 40 mm.

In light of suppression of vertical distortion in a punctured state, the maximum thickness of the support layer 16 is preferably equal to or greater than 3 mm and particularly preferably equal to or greater than 4 mm. In light of reduction in the weight of the tire 2, the maximum thickness is preferably equal to or less than 15 mm and particularly preferably equal to or less than 10 mm.

The belt 18 is located outward of the carcass 14 in the radial direction. The belt 18 is laminated on the carcass 14. The belt 18 reinforces the carcass 14. The belt 18 includes an inner layer 58 and an outer layer 60. As is obvious from FIG. 1, the width of the inner layer 58 is slightly greater than the width of the outer layer 60. Each of the inner layer 58 and the outer layer 60 includes a large number of cords aligned with each other, and a topping rubber, which are not shown. Each cord is tilted relative to the equator plane. Normally, the absolute value of the tilt angle is equal to or greater than 10° but equal to or less than 35°. The direction in which each cord of the inner layer 58 is tilted relative to the equator plane is opposite to the direction in which each cord of the outer layer 60 is tilted relative to the equator plane. The material of the cords is preferably steel. An organic fiber may be used for the cords. The topping rubber may include a large number of short fibers. The width, in the axial direction, of the belt 18 is preferably equal to or greater than 0.85 times of a maximum width W (described in detail later) of the tire 2 and equal to or less than 1.0 time of the maximum width W of the tire 2. The belt 18 may include three or more layers.

The band 20 covers the belt 18. The band 20 includes a cord and a topping rubber, which are not shown. The cord is helically wound. The band 20 has a so-called jointless structure. The cord extends substantially in the circumferential direction. The angle of the cord relative to the circumferential direction is equal to or less than 5°. Particularly, the angle is equal to or less than 2°. The belt 18 is secured by the cord so that lifting of the belt 18 is suppressed. The cord is formed from an organic fiber. Examples of preferable organic fibers include nylon fibers, polyester fibers, rayon fibers, polyethylene naphthalate fibers, and aramid fibers.

The tire 2 may include, instead of the band 20, an edge band which covers only the vicinity of the end 56 of the belt 18. The tire 2 may include both the band 20 and the edge band.

The inner liner 22 is bonded to inner peripheral surfaces of the carcass 14 and the support layer 16. The inner liner 22 is formed from a crosslinked rubber. A rubber that has an excellent air blocking property is used for the inner liner 22. The inner liner 22 maintains the internal pressure of the tire 2. The belt 18 can also block the air. Therefore, the tire 2 may include an inner liner 22 which is present on only a region other than the region in which the inner liner 22 would overlap the belt 18.

Figure 2:
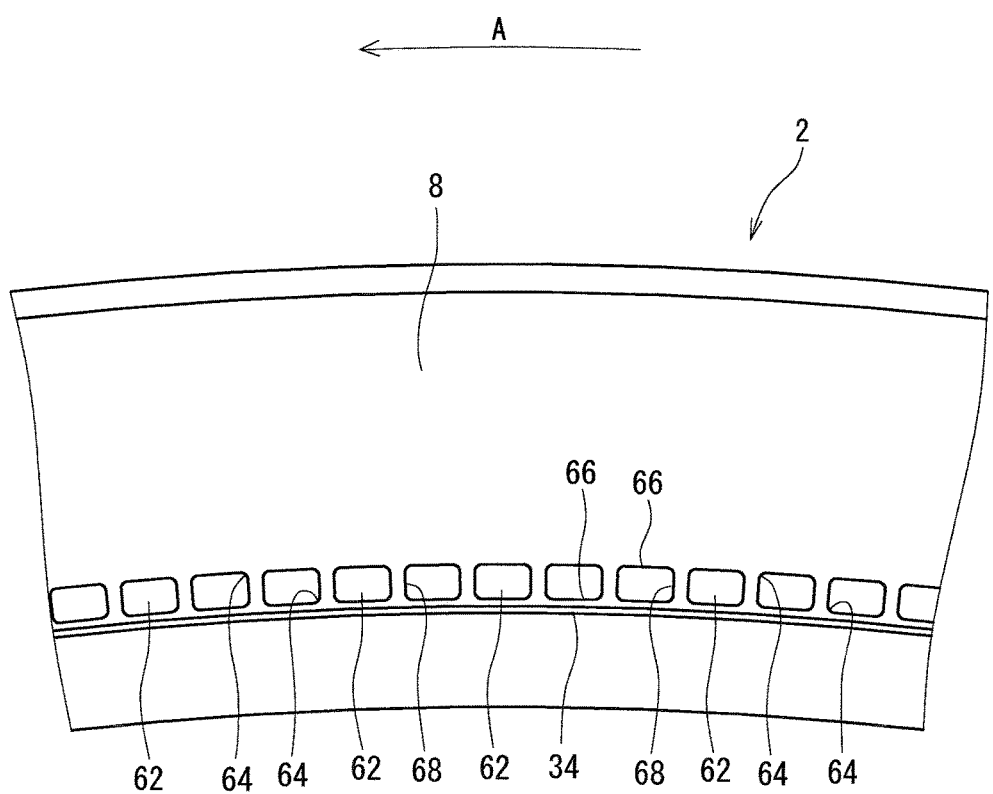
FIG. 2 is a front view showing a portion of a side surface of the tire in FIG. 1.
Figure 3:
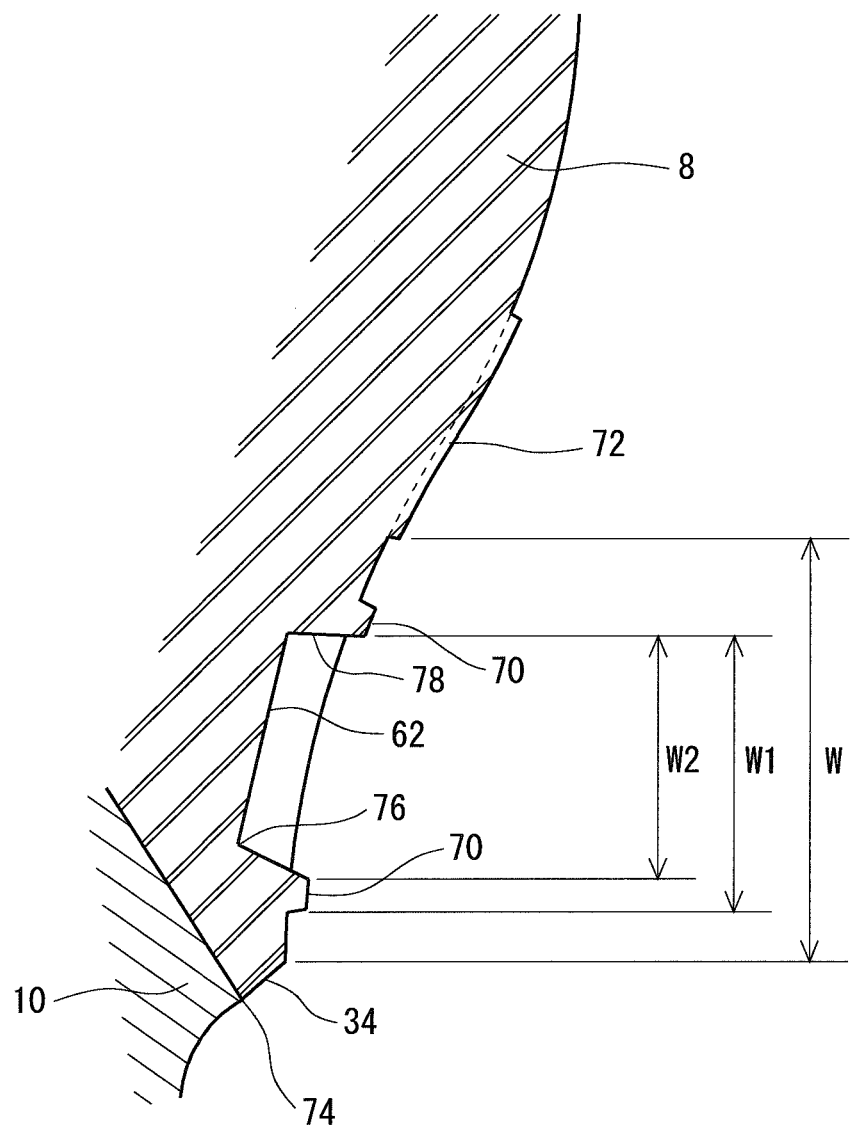
FIG. 3 is an enlarged cross-sectional view showing a portion of the tire in FIG. 2.
Figure 4:
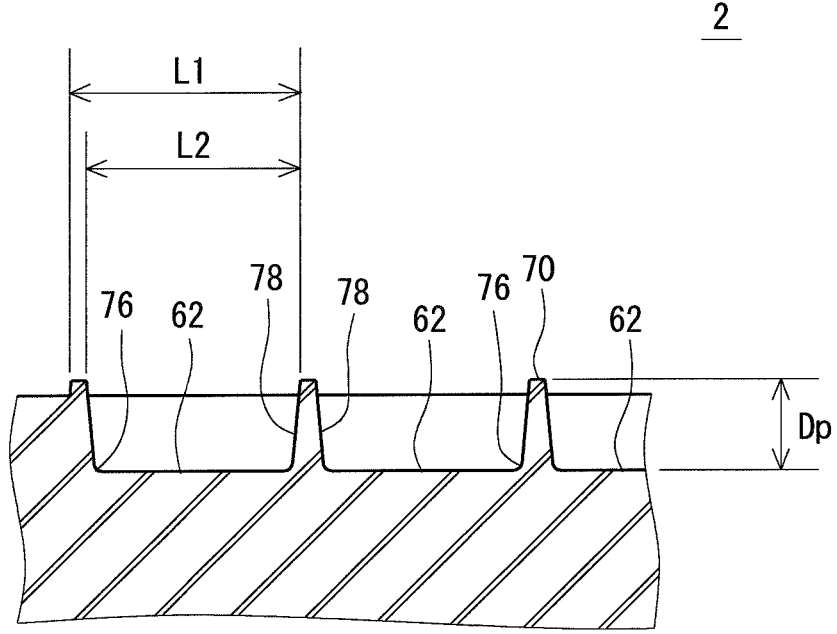
FIG. 4 is an enlarged cross-sectional view showing a portion of the tire in FIG. 2.

FIG. 2 shows a side surface of the tire 2. In FIG. 2, the up-down direction is the radial direction, and the direction indicated by an arrow A is the circumferential direction. FIG. 3 shows a cross section of the tire 2 made by cutting through a plane including an axis. FIG. 4 shows a cross section of the tire 2 made by cutting through a curved surface extending in the circumferential direction. As shown in FIGS. 1 to 4, the tire 2 has a large number of dimples 62 on a side surface thereof. In the present invention, the side surface means a region of an outer surface of the tire 2 which can be viewed in the axial direction. Typically, the dimples 62 are formed on the surface of the sidewall 8.

As shown in FIG. 2, a large number of dimples 62 are arranged along the circumferential direction. In the tire 2, the number of rows of the dimples 62 is 1. A plane shape of each dimple 62 is substantially a rectangle. Each corner 64 of the rectangle is rounded. Dirt is less likely to accumulate in the rounded corner 64. In this respect, the radius of the round of the corner is preferably equal to or greater than 1.0 mm. In light of reduction in the weight of the tire 2, the radius of the round of is preferably equal to or less than 3.0 mm. The corner 64 may not be rounded.

The plane shape includes two long sides 66 and two short sides 68. The short sides 68 extend in the radial direction. The short sides 68 may be slightly inclined with respect to the radial direction. The plane shape in which the short sides 68 are inclined is a parallelogram. In the present invention, the plane shape in which the short sides 68 are slightly inclined with respect to the radial direction is included in the concept of "substantially a rectangle". As shown in FIGS. 3 and 4, the dimple 62 is surrounded by a rib 70. The tire 2 may not include the rib 70. In other words, an edge of the dimple 62 may be located on a profile surface of the tire 2.

The surface area of the sidewall 8 having the dimples 62 is larger than the surface area of the sidewall 8 when it is postulated that no dimples 62 exist thereon. The area of contact between the tire 2 and the atmosphere is large. The large area of contact promotes release of heat from the tire 2 to the atmosphere.

The tire 2 rotates during running. A vehicle on which the tire 2 is mounted travels. By the rotation of the tire 2 and the travelling of the vehicle, air flows across the dimples 62. At that time, eddies are generated in the flow of the air. In other words, turbulent flow is generated at the dimple 62. When running with the tire 2 is continued in a punctured state, deformation and restoration of the support layer 16 are repeated. Due to the repetition, heat is generated in the support layer 16. The turbulent flow promotes release of the heat to the atmosphere. In the tire 2, breakage of rubber components and separation among the rubber components which are caused due to heat are suppressed. The tire 2 allows for running for a long period of time in a punctured state. The turbulent flow contributes to heat release not only in a punctured state but also in a normal state. The dimples 62 also contribute to durability of the tire 2 in a normal state. Running of the vehicle in a state where the internal pressure is less than a normal value may be inadvertently caused by a driver. The dimples 62 can also contribute to durability of the tire 2 in this case.

In the tire 2, since temperature rise is suppressed by the dimples 62, the strength of the bead 12 is less likely to deteriorate. Thus, even when the support layer 16 is thin, running in a punctured state for a long period of time is possible. The thin support layer 16 achieves reduction in the weight of the tire 2. The thin support layer 16 reduces rolling resistance. The tire 2 which is lightweight and has reduced rolling resistance contributes to reduction in the fuel consumption of a vehicle. Furthermore, the thin support layer 16 also achieves excellent ride comfort.

FIG. 3 shows a marking 72. In FIGS. 1 and 2, the marking 72 is not shown. The marking 72 indicates size, month and year of manufacture, E number, the type of tire, and the like. In the radial direction, the dimples 62 are positioned between the marking 72 and the rim protector 34. The region between the marking 72 and the rim protector 34 is referred to as a "processible region". The dimples 62 are formed in the processible region. In FIG. 3, an arrow W indicates a width, in the radial direction, of the processible region. Hereinafter, the width W is referred to as a "processible width". In a tire 2 which does not include the rim protector 34, a region between the marking 72 and an inner end 74, in the radial direction, of the sidewall 8 is the processible region.

In FIG. 3, an arrow W1 indicates a processed width, in the radial direction, of the dimple 62. An arrow W2 indicates a width, in the radial direction, of the dimple 62. The processed width W1 is the sum of the width W2 of the dimple 62 and a width of the rib 70. From the standpoint that turbulent flow is easily generated, the width W2 is preferably equal to or greater than 0.8 mm and particularly preferably equal to or greater than 2.8 mm. The width of the rib 70 is preferably equal to or greater than 0.5 mm but equal to or less than 3.0 mm, and particularly preferably equal to or greater than 0.8 mm but equal to or less than 2.0 mm.

In FIG. 4, an arrow L1 indicates a processed length, in the circumferential direction, of the dimple 62. An arrow L2 indicates a length, in the circumferential direction, of the dimple 62. The processed length L1 is the sum of the length L2 of the dimple 62 and the width of the rib 70. In light of reduction in the weight of the tire 2, the length L2 is preferably equal to or greater than 0.8 mm and particularly preferably equal to or greater than 2.8 mm. From the standpoint that turbulent flow is easily generated, the length L2 is preferably equal to or less than 40 mm and particularly preferably equal to or less than 30 mm.

As shown in FIGS. 3 and 4, each corner 76 in the cross section is rounded. Dirt is less likely to accumulate in the rounded corner 76. The corner 76 may not be rounded.

In the tire 2 having the marking 72, the processible width W is likely to be small. In the processible region, a dimple 62 having the width W2 of excessively large cannot be arranged. In the processible region, a dimple 62 having excessively large length L2 with respect to the width W2 is difficult to exert the effect of heat release. A dimple 62 in which the plane shape is substantially a rectangle and a ratio (L2/W2) of the length L2 to the width W2 is equal to or greater than 1.0 and equal to or less than 3.0 is suitable for the prosessible region. The dimple 62 is suitable for a tire 2 having a prosessible width W of equal to or greater than 2.0 mm and equal to or less than 8.0 mm. The dimple 62 is also suitable for a tire 2 having a prosessible width W of equal to or greater than 7 mm and equal to or less than 10 mm. In light of reduction in the weight of the tire 2, the ratio (L2/W2) is particularly preferably equal to or greater than 1.7.

As shown in FIGS. 3 and 4, a cross-sectional shape of the dimple 62 is a trapezoid. In other words, side surfaces 78 of the dimple 62 are inclined with respect to the direction of normal line of the sidewall 8. An angle of each side surface 78 relative to the direction of the normal line is preferably equal to or greater than 5° and equal to or less than 15°. Dirt is less likely to accumulate in the dimple 62.

The side surface of the dimple may extend along the direction of the normal line of the sidewall 8. The dimple contributes to reduction in the weight of the tire.

In FIG. 4, an arrow Dp indicates a depth of the dimple 62. From the standpoint that turbulent flow is easily generated, the depth Dp is preferably equal to or greater than 0.5 mm and particularly preferably equal to or greater than 1.0 mm. In light of reduction in the weight of the tire 2, the depth Dp is preferably equal to or less than 4.0 mm and particularly preferably equal to or less than 3.0 mm.

From the standpoint that turbulent flow is easily generated, the number of the dimples 62 included in one row is preferably equal to or greater than 150 and particularly preferably equal to or greater than 200. In light of reduction in the weight of the tire 2, the number is preferably equal to or less than 1000 and particularly preferably equal to or less than 850.

The dimples 62 may be present only on a side surface (hereinafter, referred to as a "back-side side surface") that is at the inner side in a width direction of a vehicle when the tire is mounted on the vehicle. The temperature of the back-side side surface is prone to high temperature as compared with a side surface (hereinafter, referred to as a "front-side side surface") that is at the outer side in the width direction of the vehicle. Alignment of suspension is generally negative camber. In case of the negative camber, a large load is applied to the back-side side surface. A tire 2 in which the dimples 62 are present on the back-side side surface is less likely to be damaged. The dimples 62 are not present on the front-side side surface of the tire 2. Therefore, the degree of freedom in the design of the front-side side surface is high. Since the back-side side surface is hidden in a body of the vehicle, the dimples 62 thereon do not impair the appearance of the tire 2. The tire 2 which does not include the dimples 62 on the front-side side surface is lightweight.

The dimples 62 may be present on both the back-side side surface and the front-side side surface. Preferably, the number of the dimples 62 on the back-side side surface is greater than the number of the dimples 62 on the front-side side surface.

In production of the tire 2, a plurality of rubber components are assembled to obtain a raw cover (unvulcanized tire). The raw cover is put into a mold. The outer surface of the raw cover abuts against the cavity surface of the mold. The inner surface of the raw cover abuts against a bladder or a core. The raw cover is pressurized and heated in the mold. The rubber composition in the raw cover flows due to the pressurization and the heating. Cross-linking reaction is caused in the rubber due to the heating, to obtain the tire 2. The dimples 62 are formed in the tire 2 by using a mold having pimples on a cavity surface thereof.

The dimensions and angles of each component of the tire are measured in a state where the tire is mounted on a normal rim and inflated to a normal internal pressure, unless otherwise specified. During the measurement, no load is applied to the tire. In the present specification, the normal rim means a rim specified in a standard on which the tire is based. The "standard rim" in the JATMA standard, the "Design Rim" in the TRA standard, and the "Measuring Rim" in the ETRTO standard are normal rims. In the present specification, the normal internal pressure means an internal pressure specified in the standard on which the tire is based. The "highest air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are normal internal pressures. It should be noted that in the case of a tire for passenger car, the dimensions and angles are measured in a state where the internal pressure is 180 kPa.

Figure 5:
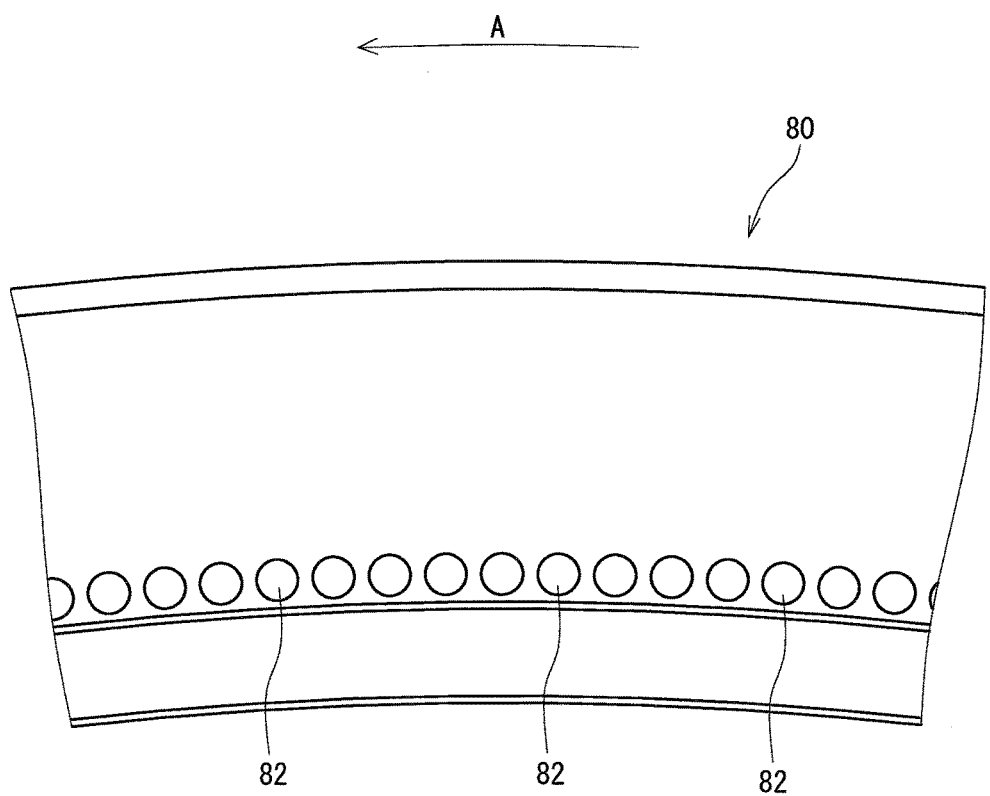
FIG. 5 is a front view showing a portion of a side surface of a pneumatic tire according to another embodiment of the present invention.

FIG. 5 is a front view showing a portion of a side surface of a pneumatic tire 80 according to another embodiment of the present invention. The tire 80 has a large number of dimples 82. The configuration of the tire 80 except for the dimples 82 is the same as that of the tire 2 shown in FIG. 1.

As shown in FIG. 5, the large number of dimples 82 are arranged along the circumferential direction. In the tire 80, the number of rows of the dimples 82 is 1. The plane shape of each dimple 82 is a circle. The dimple 82 is also surrounded by a rib, which is not shown. The rib is annular. The processed width W1 of the dimple 82 is the sum of a dimple diameter and a width of the rib. The processed length L1 of the dimple 82 is the sum of the dimple diameter and the width of the rib.

The surface area of the side surface having the dimples 82 is large. The dimples 82 generate turbulent flow. The dimples 82 can contribute to durability of the tire 80.

The tire 80 includes a marking, which is not shown. In the tire 80, the processible width W is likely to be small. The dimples 82 each having a plane shape of a circle are suitable for the processible region. The dimples 82 are suitable for the tire 80 having a processible width W of equal to or greater than 2.0 mm and equal to or less than 8.0 mm.

A cross-sectional shape of the dimple 82 is a trapezoid, which is not shown. The cross-sectional shape may be a circular arc.

Figure 6:
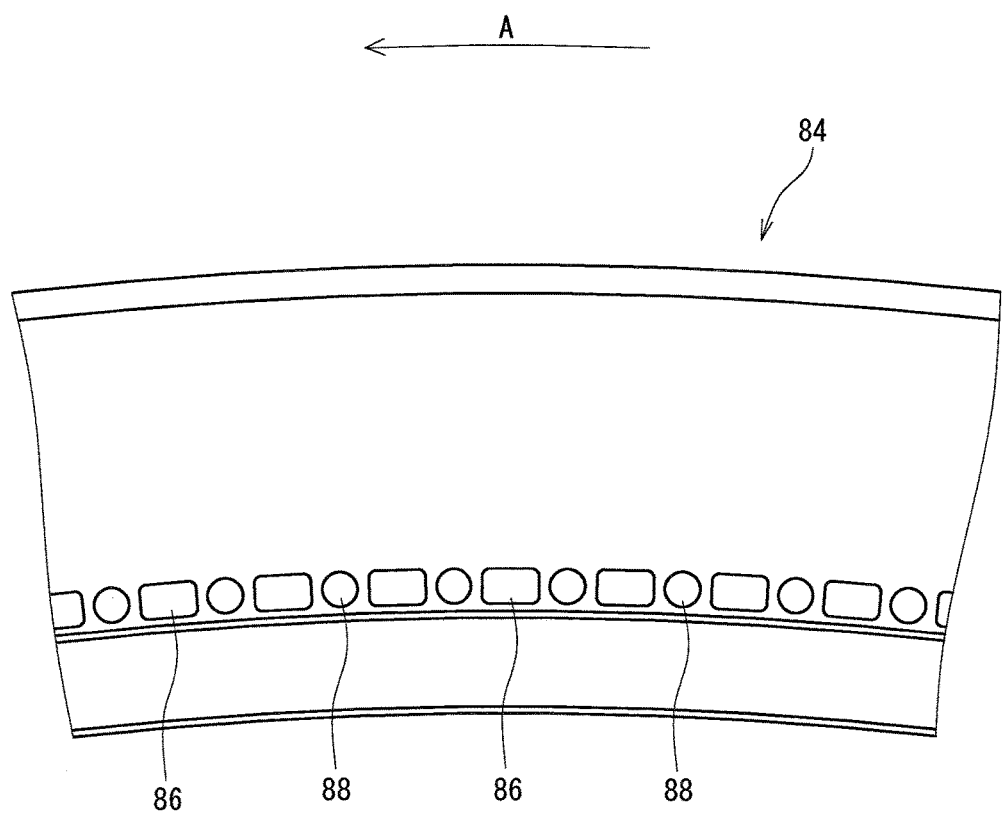
FIG. 6 is a front view showing a portion of a side surface of a pneumatic tire according to still another embodiment of the present invention.

FIG. 6 is a front view showing a portion of a side surface of a pneumatic tire 84 according to still another embodiment of the present invention. The tire 84 has a large number of first dimples 86 and a large number of second dimples 88. The configuration of the tire 84 except for the dimples is the same as that of the tire 2 shown in FIG. 1.

As shown in FIG. 6, the first dimples 86 and the second dimples 88 are arranged along the circumferential direction. The first dimples 86 and the second dimples 88 are alternately arranged. In the tire 84, the number of rows of the dimples is 1. The number of the first dimples 86 is the same as that of the second dimples 88. The number of the first dimples 86 may be different from the number of the second dimples 88.

The plane shape of each first dimple 86 is substantially a rectangle. The first dimple 86 is surrounded by a rib, which is not shown. The processed width of the first dimple 86 is the sum of the width of the first dimple 86 and the width of the rib. The processed length of the first dimple 86 is the sum of the length of the first dimple 86 and the width of the rib. In the first dimple 86, the ratio (L2/W2) of the length L2 to the width W2 is equal to or greater than 1.0 and equal to or less than 3.0.

The plane shape of each second dimple 88 is a circle. The processed width of the second dimple 88 is the sum of the dimple diameter and the width of the rib. The processed length of the second dimple 88 is the sum of the dimple diameter and the width of the rib.

The surface area of the side surface having the first dimples 86 and the second dimples 88 is large. The first dimples 86 and the second dimples 88 generate turbulent flow. The first dimples 86 and the second dimples 88 can contribute to durability of the tire 84.

The tire 84 includes a marking, which is not shown. In the tire 84, the processible width W is likely to be small. The combination of the first dimples 86 and the second dimples 88 is suitable for the processible region. The first dimples 86 and the second dimples 88 are suitable for the tire 84 having a processible width W of equal to or greater than 2.0 mm and equal to or less than 8.0 mm.

Figure 7:
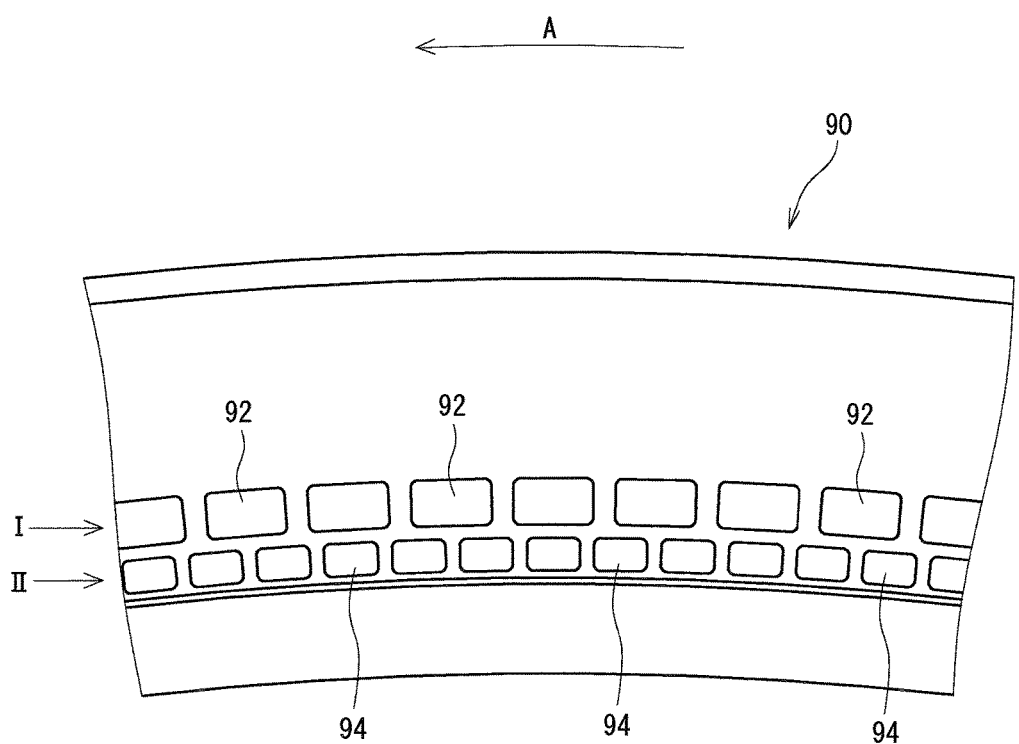
FIG. 7 is a front view showing a portion of a side surface of a pneumatic tire according to still another embodiment of the present invention.

FIG. 7 is a front view showing a portion of a side surface of a pneumatic tire 90 according to still another embodiment of the present invention. The tire 90 has a large number of first dimples 92 and a large number of second dimples 94. The configuration of the tire 90 except for the dimples is the same as that of the tire 2 shown in FIG. 1.

The large number of first dimples 92 are arranged along the circumferential direction. A row I is formed by these first dimples 92. The large number of second dimples 94 are arrange along the circumferential direction. A row II is formed by these second dimples 94. In the tire 90, the number of rows of the dimples is 2. The first dimples 92 are positioned outward the second dimples 94 in the radial direction.

The plane shape of each first dimple 92 is substantially a rectangle. The first dimple 92 is surrounded by a rib, which is not shown. The processed width of the first dimple 92 is the sum of the width of the first dimple 92 and the width of the rib. The processed length of the first dimple 92 is the sum of the length of the first dimple 92 and the width of the rib. In the first dimple 92, the ratio ($L2/W2$) of the length $L2$ to the width $W2$ is equal to or greater than 1.0 and equal to or less than 3.0.

The plane shape of each second dimple 94 is substantially a rectangle. The second dimple 94 is surrounded by a rib, which is not shown. The processed width of the second dimple 94 is the sum of the width of the second dimple 94 and the width of the rib. The processed length of the second dimple 94 is the sum of the length of the second dimple 94 and the width of the rib. In the second dimple 94, the ratio ($L2/W2$) of the length $L2$ to the width $W2$ is equal to or greater than 1.0 and equal to or less than 3.0.

The surface area of the side surface having the first dimples 92 and the second dimples 94 is large. The first dimples 92 and the second dimples 94 generate turbulent flow. The first dimples 92 and the second dimples 94 can contribute to durability of the tire 90.

The tire 90 includes a marking, which is not shown. In the tire 90, the processible width W is likely to be small. The combination of the first dimples 92 and the second dimples 94 is suitable for the processible region. The width of the first dimple 92 is greater than the width of the second dimple 94. A row I is formed by the first dimples 92 each having a large width. Then, in the rest of the processible region, the second dimples 94 each having a small width are arranged. This dimple pattern promotes release of heat. The width of the dimples of the row II may be greater than the width of the dimples of the row I.

Positions of the first dimples 92 overlap the position of the end 52 (See FIG. 1) of the apex 40 in the radial direction, which is not shown. During running in a punctured state, the breakage and the separation are likely to occur in the vicinity of the end 52 of the apex 40. The first dimple 92 is more excellent in the effect of heat release than the second dimple 94. In the tire 90 in which the positions of the first dimples 92 overlap the position of the end 52 of the apex 40, the breakage and the separation are suppressed.

When the processible width W is equal to or greater than 9.0 mm and equal to or less than 12.0 mm, dimples in each of which the plane shape is substantially a rectangle, the ratio of the length in the circumferential direction to the width in the radial direction is equal to or greater than 1.0 and equal to or less than 3.0, and the width in the radial direction is 7 mm are suitable for the row I. For the row II, (1) dimples in each of which the plane shape is a circle, and a diameter thereof is equal to or greater than 2.0 mm and equal to or less than 5.0 mm are suitable. For the row II, (2) dimples in each of which the plane shape is substantially a rectangle, the ratio of the length in the circumferential direction to the width in radial direction is equal to or greater than 1.0 and equal to or less than 3.0, and the width in the radial direction is equal to or greater than 2.0 mm and equal to or less than 5.0 mm are also suitable. The row II may include both the dimples (1) and the dimples (2).

When the processible width W is equal to or greater than 12.0 mm and equal to or less than 17.0 mm, dimples in each of which the plane shape is substantially a rectangle, the ratio of the length in the circumferential direction to the width in the radial direction is equal to or greater than 1.0 and equal to or less than 3.0, and the width in the radial direction is equal to or greater than 7.0 mm and equal to or less than 10.0 mm are suitable for the row I. For the row II, (1) dimples in each of which the plane shape is a circle, and a diameter thereof is equal to or greater than 2.0 mm and equal to or less than 10.0 mm are suitable. For the row II, (2) dimples in each of which the plane shape is substantially a rectangle, the ratio of the length in the circumferential direction to the width in the radial direction is equal to or greater than 1.0 and equal to or less than 3.0, and the width in the radial direction is equal to or greater than 2.0 mm and equal to or less than 10.0 mm are also suitable. The row II may include both the dimples (1) and the dimples (2).

When the processible width W is equal to or greater than 17.0 mm and equal to or less than 20.0 mm, dimples in each of which the plane shape is substantially a rectangle, the ratio of the length in the circumferential direction to the width in the radial direction is equal to or greater than 1.0 and equal to or less than 3.0, and the width in the radial direction is 10 mm are suitable for the row I. For the row II, (1) dimples in each of which the plane shape is a circle, and a diameter thereof is equal to or greater than 7.0 mm and equal to or less than 10.0 mm are suitable. For the row II, (2) dimples in each of which the plane shape is substantially a rectangle, the ratio of the length in the circumferential direction to the width in the radial direction is equal to or greater than 1.0 and equal to or less than 3.0, and the width in the radial direction is equal to or greater than 7.0 mm and equal to or less than 10.0 mm are also suitable. The row II may include both the dimples (1) and the dimples (2). The circular dimple having a diameter of equal to or less than 10.0 mm does not impair the appearance of the tire. The rectangular dimple having a width in the radial direction of equal to or less than 10.0 mm does not impair the appearance of the tire.

Figure 8:
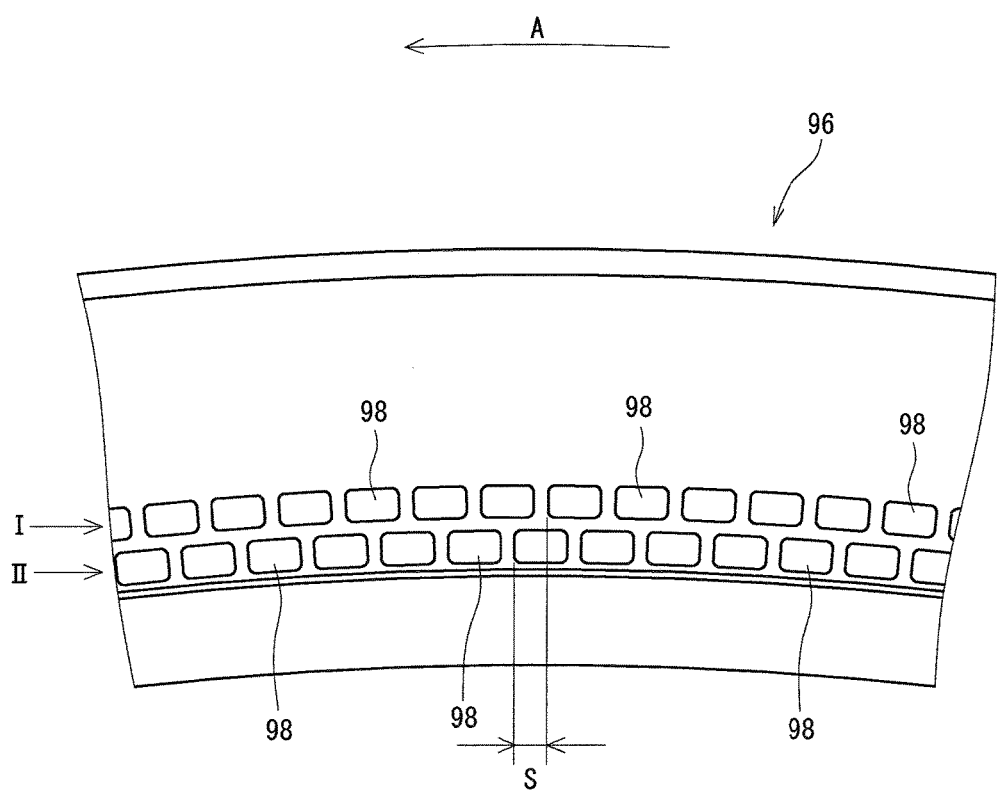
FIG. 8 is a front view showing a portion of a side surface of a pneumatic tire according to still another embodiment of the present invention.

FIG. 8 is a front view showing a portion of a side surface of a pneumatic tire 96 according to still another embodiment of the present invention. The tire 96 has a large number of dimples 98. The configuration of the tire 96 except for the dimples 98 is the same as that of the tire 2 shown in FIG. 1.

In the tire 96, the number of rows of the dimples 98 is 2. The shape of the dimples 98 of the row I is the same as that of the dimples 98 of the row II. The number of the dimples 98 included in the row I is the same as that of the dimples 98 included in the row II.

The plane shape of the dimple 98 is substantially a rectangle. The dimple 98 is surrounded by a rib, which is not shown. The processed width of the dimple 98 is the sum of the width of the dimple 98 and the width of the rib. The processed length of the dimple 98 is the sum of the length of the dimple 98 and the width of the rib. In the dimple 98, the ratio (L2/W2) of the length L2 to the width W2 is equal to or greater than 1.0 and equal to or less than 3.0.

As is obvious from FIG. 8, the position of each dimple 98 of the first row is displaced in the circumferential direction relative to the position of each dimple 98 of the second row. In the tire 96, portions that generate turbulent flow are not unevenly distributed. A distance of the displacement is shown by an arrow S in FIG. 8. The distance S is preferably equal to or greater than 3 mm and particularly preferably equal to or greater than 7 mm.

In light of promotion of heat release, the distance S is preferably equal to or greater than 15% and equal to or less than 85% of the length L2 of the dimple 98, and particularly preferably equal to or greater than 30% and equal to or less than 70% of the length L2 of the dimple 98. Ideally, the distance S is 50% of the length L2.

EXAMPLES

The following will show effects of the present invention by means of examples, but the present invention should not be construed in a limited manner based on the description of these examples.

Example 1

The run flat tires shown in FIGS. 1-4 were produced. The size of the tire is 235/55R18. The side surface of the tire includes a large number of dimples. The number of rows of the dimples is 1. The plane shape of each dimple is a rectangle. The cross-sectional shape of the dimple is a trapezoid. The number of the dimples is 817. Details of the size of the dimple are shown in Table 1.

Comparative Example 1

Tire of Comparative Example 1 were obtained in the same manner as Example 1, except the dimples were not formed.

Examples 2 to 5 and Comparative Example 2

Tires of Examples 2 to 5 and Comparative Example 2 were obtained in the same manner as Example 1, except the number and size of dimples were as shown in Tables 1 and 2 below.

Example 6

The run flat tire shown in FIG. 6 was produced. The tire has 204 circular dimples and 204 rectangular dimples. The structure of the tire other than the dimples is the same as that of the tire shown in FIG. 1.

Example 7

The run flat tire shown in FIG. 5 was produced. The tire has 817 circular dimples. The cross-sectional shape of each dimple is a circular arc. The structure of the tire other than the dimples is the same as that of the tire shown in FIG. 1.

Examples 8 to 10

Tires of Examples 8 to 10 were obtained in the same manner as Example 7, except the cross-sectional shapes, the numbers and the sizes of dimples were as shown in Table 3 below.

Example 11

The run flat tire shown in FIG. 8 was produced. The tire has 148 rectangular dimples. The number of rows of the dimples is 2. The row I includes 91 dimples. The row II also includes 91 dimples. The cross-sectional shape of each dimple is a trapezoid. Details of the size of the dimple are shown in Table 4 below. The distance S between the dimples of the row I and dimples of the row II is 9.0 mm.

Examples 12 to 14

Tires of Examples 12 to 14 were obtained in the same manner as Example 11, except the distance S was as shown in Table 4 below. The structure of the tire other than dimples is the same as that the tire shown in FIG. 1.

Example 15

The run flat tire shown in FIG. 7 was produced. The tire has 91 first dimples in the row I. The plane shape of each first dimple is a rectangle. The cross-sectional shape of each first dimple is a trapezoid. The tire has 109 second dimples in the row II. The plane shape of each second dimple is a rectangle. The cross-sectional shape of each second dimple is a trapezoid. Details of the size of the dimples are shown in Table 4 below.

[Measurement of Weight]

Weights of tires were measured. Values obtained by subtracting the weight of the tire of Comparative Example 1 from each weight of the tires of Examples are shown in Tables 1 to 4 below.

[Running Test]

Each tire was mounted on a rim having the size of 8.5 J and inflated such that the internal pressure thereof became 220 kPa. A valve core of the tire was removed to cause the inside of the tire to communicate with the atmosphere. The tire was run on a drum while applying the load of 4.3 kN to the tire. The running speed was 80 km/h. A running distance until abnormal noise was generated from the tire was measured. The results are shown as indexes in Tables 1 to 4 below.

TABLE 1

Results of Evaluation

|  | Comp. Ex. 1 | Ex. 1 | Ex. 2 | Ex. 3 |
|---|---|---|---|---|
| Processible width W (mm) | 3.2 | 3.2 | 4.2 | 8.2 |
| Plane shape | — | rect. | rect. | rect. |
| Cross-sectional shape | — | trap. | trap. | trap. |
| Depth (mm) | — | 2.0 | 2.0 | 2.0 |
| Circular dimple |  |  |  |  |
| Number of dimples | — | — | — | — |
| Diameter (mm) | — | — | — | — |
| Processed length L1 (mm) | — | — | — | — |

TABLE 1-continued

Results of Evaluation

|  | Comp. Ex. 1 | Ex. 1 | Ex. 2 | Ex. 3 |
|---|---|---|---|---|
| Processed width W1 (mm) | — | — | — | — |
| Rectangular dimple |  |  |  |  |
| Number of dimples | — | 817 | 272 | 91 |
| Length L2 (mm) | — | 0.8 | 4.8 | 16.8 |
| Width W2 (mm) | — | 0.8 | 2.8 | 5.8 |
| L2/W2 | — | 1.0 | 1.7 | 2.9 |
| Processed length L1 (mm) | — | 2 | 6 | 18 |
| Processed width W1 (mm) | — | 2 | 4 | 7 |
| Increased weight (g) | 0 | 61 | 64 | 94 |
| Running distance (index) | 100 | 102 | 106 | 130 | rect.: rectangle
trap.: trapezoid

TABLE 2

Results of Evaluation

|  | Ex. 4 | Ex. 5 | Comp. Ex. 2 | Ex. 6 |
|---|---|---|---|---|
| Processible width W (mm) | 9.2 | 11.2 | 9.2 | 5.0 |
| Plane shape | rect. | rect. | rect. | circle rect. |
| Cross-sectional shape | trap. | trap. | trap. | trap. |
| Depth (mm) | 2.0 | 2.0 | 2.0 | 2.0 |
| Circular dimple |  |  |  |  |
| Number of dimples | — | — | — | 204 |
| Diameter (mm) | — | — | — | 3.0 |
| Processed length L1 (mm) | — | — | — | 4.0 |
| Processed width W1 (mm) | — | — | — | 4.0 |
| Rectangular dimple |  |  |  |  |
| Number of dimples | 74 | 78 | 53 | 204 |
| Length L2 (mm) | 20.4 | 19.8 | 29.8 | 3.0 |
| Width W2 (mm) | 6.8 | 8.8 | 6.8 | 3.0 |
| L2/W2 | 3.0 | 2.3 | 4.4 | 1.0 |
| Processed length L1 (mm) | 21.6 | 21.0 | 31.0 | 4.0 |
| Processed width W1 (mm) | 8.0 | 10.0 | 8.0 | 4.0 |
| Increased weight (g) | 62 | 61 | 52 | 67 |
| Running distance (index) | 135 | 145 | 101 | 108 | rect.: rectangle
trap.: trapezoid

TABLE 3

Results of Evaluation

|  | Ex. 7 | Ex. 8 | Ex. 9 | Ex. 10 |
|---|---|---|---|---|
| Processible width W (mm) | 3.0 | 5.0 | 8.0 | 9.0 |
| Plane shape | circle | circle | circle | circle |
| Cross-sectional shape | circula arc | trap. | trap. | trap. |
| Depth (mm) | 1.0 | 2.0 | 2.0 | 2.0 |
| Circular dimple |  |  |  |  |
| Number of dimples | 817 | 408 | 233 | 204 |
| Diameter (mm) | 0.8 | 3.0 | 6.0 | 7.0 |
| Processed length L1 (mm) | 2.0 | 4.0 | 7.0 | 8.0 |
| Processed width W1 (mm) | 2.0 | 4.0 | 7.0 | 8.0 |
| Rectangular dimple |  |  |  |  |
| Number of dimples | — | — | — | — |
| Length L2 (mm) | — | — | — | — |
| Width W2 (mm) | — | — | — | — |

TABLE 3-continued

Results of Evaluation

|  | Ex. 7 | Ex. 8 | Ex. 9 | Ex. 10 |
|---|---|---|---|---|
| L2/W2 | — | — | — | — |
| Processed length L1 (mm) | — | — | — | — |
| Processed width W1 (mm) | — | — | — | — |
| Increased weight (g) | 35 | 81 | 108 | 116 |
| Running distance (index) | 104 | 108 | 135 | 140 | trap.: trapezoid

TABLE 4

Results of Evaluation

|  | Ex. 11 | Ex. 12 | Ex. 13 | Ex. 14 | Ex. 15 |
|---|---|---|---|---|---|
| Processible width W (mm) | 18.2 | 18.2 | 18.2 | 18.2 | 18.2 |
| First row |  |  |  |  |  |
| Plane shape | rect. | rect. | rect. | rect. | rect. |
| Cross-sectional shape | trap. | trap. | trap. | trap. | trap. |
| Depth (mm) | 2.0 | 2.0 | 2.0 | 2.0 | 2.0 |
| Number of dimples | 91 | 91 | 91 | 91 | 91 |
| Length L2 (mm) | 16.8 | 16.8 | 16.8 | 16.8 | 16.8 |
| Width W2 (mm) | 8.8 | 8.8 | 8.8 | 8.8 | 8.8 |
| L2/W2 | 1.9 | 1.9 | 1.9 | 1.9 | 1.9 |
| Processed length L1 (mm) | 18.0 | 18.0 | 18.0 | 18.0 | 18.0 |
| Processed width W1 (mm) | 10.0 | 10.0 | 10.0 | 10.0 | 10.0 |
| Second row |  |  |  |  |  |
| Plane shape | rect. | rect. | rect. | rect. | rect. |
| Cross-sectional shape | trap. | trap. | trap. | trap. | trap. |
| Depth (mm) | 2.0 | 2.0 | 2.0 | 2.0 | 2.0 |
| Number of dimples | 91 | 91 | 91 | 91 | 109 |
| Length L2 (mm) | 16.8 | 16.8 | 16.8 | 16.8 | 13.8 |
| Width W2 (mm) | 5.8 | 5.8 | 5.8 | 5.8 | 5.8 |
| L2/W2 | 2.9 | 2.9 | 2.9 | 2.9 | 2.4 |
| Processed length L1 (mm) | 18.0 | 18.0 | 18.0 | 18.0 | 15.0 |
| Processed width W1 (mm) | 7.0 | 7.0 | 7.0 | 7.0 | 7.0 |
| Distance S | 9.0 | 7.0 | 3.0 | 0.0 | — |
| Increased weight (g) | 57 | 57 | 57 | 57 | 94 |
| Running distance (index) | 180 | 165 | 162 | 160 | 200 | rect.: rectangle
trap.: trapezoid

As shown in Tables 1 to 4, the tire of each Example is excellent in durability. From the results of evaluation, advantages of the present invention are clear.

INDUSTRIAL APPLICABILITY

The pneumatic tire according to the present invention can be mounted on various vehicles.

DESCRIPTION OF THE REFERENCE CHARACTERS 2, 80, 84, 90, 96 . . . tire
4 . . . tread
8 . . . sidewall
10 . . . clinch
12 . . . bead
14 . . . carcass
16 . . . support layer
18 . . . belt
20 . . . band
62, 82, 98 . . . dimple
86, 92 . . . first dimple
88, 94 . . . second dimple

The invention claimed is:

1. A pneumatic tire comprising a marking on an axially outer surface of a sidewall in each side portion of the tire, wherein
   a processible region positioned on the axially outer surface of one or both of the sidewalls and inward, in a radial direction, of the marking includes two rows formed by a large number of dimples arranged in a circumferential direction,
   a width, in the radial direction, of the processible region is equal to or greater than 12.0 mm and equal to or less than 17.0 mm,
   the dimples forming the first radially outer row have a planar shape that is rectangular with the ratio of the length in the circumferential direction to the width in the radial direction being equal to or greater than 1.0 and equal to or less than 3.0, and the width in the radial direction being equal to or greater than 7 mm and equal to or less than 10.0 mm, and
   the dimples forming the second radially inner row are
   (1) dimples having a planar shape that is circular and a diameter equal to or greater than 2.0 mm and equal to or less than 10.0 mm, or
   (2) dimples having a planar shape that is rectangular with the ratio of the length in the circumferential direction to the width in the radial direction being equal to or greater than 1.0 and equal to or less than 3.0, and the width in the radial direction being equal to or greater than 2.0 mm and equal to or less than 10.0 mm.

2. The tire according to claim 1, further comprising a pair of beads, each bead located radially inward of the respective sidewall and comprising a bead apex, wherein
   the width, in the radial direction, of each dimple of one of the rows is greater than the width, in the radial direction, of each dimple of the other one of the rows, and
   in the radial direction, a position of each dimple of the radially outer row overlaps a position of the radially outer end of the bead apex.

3. The tire according to claim 1, wherein
   the number of dimples of the first radially outer row is equal to the number of dimples of the second radially inner row,
   the length, in the circumferential direction, of each dimple of the first radially outer row is equal to the length, in the circumferential direction, of each dimple of the second radially inner row, and
   the position of each dimple of the first radially outer row is displaced in the circumferential direction relative to the position of each dimple of the second radially inner row.

4. The tire according to claim 1, further comprising a rim protector, wherein the region radially between the rim protector and the marking is the processible region.

5. The tire according to claim 1, further comprising:
   a tread having an outer surface which forms a tread surface;
   the pair of sidewalls each extending from an end, respectively, of the tread substantially inward in the radial direction;
   a pair of beads each located substantially inward of the sidewalls in the radial direction;
   a carcass extending along the tread and the sidewalls and on and between the beads; and a pair of run flat load support layers each located inward of the sidewalls in the axial direction.

6. The tire according to claim 1, wherein one axially outer sidewall surface thereof includes the two rows of dimples, and the other axially outer sidewall surface does not include any of the dimples.

* * * * *